(12) United States Patent
Byers et al.

(10) Patent No.: US 7,162,158 B2
(45) Date of Patent: *Jan. 9, 2007

(54) INTERCONNECTING PROCESSING UNITS OF A STORED PROGRAM CONTROLLED SYSTEM USING SPACE DIVISION MULTIPLEXED FREE SPACE OPTICS

(75) Inventors: Charles Calvin Byers, Aurora, IL (US); Daniel Raymond Hatcher, Clinton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1005 days.

This patent is subject to a terminal disclaimer.

(21) Appl. No.: 09/932,706

(22) Filed: Aug. 17, 2001

(65) Prior Publication Data

US 2003/0210910 A1 Nov. 13, 2003

(51) Int. Cl.
*H04B 10/00* (2006.01)
(52) U.S. Cl. ...................... 398/128; 398/118
(58) Field of Classification Search ......... 398/118–131
See application file for complete search history.

(56) References Cited

U.S. PATENT DOCUMENTS

| 5,170,269 | A | 12/1992 | Lin | 359/9 |
|---|---|---|---|---|
| 5,204,866 | A | 4/1993 | Block | 372/27 |
| 5,245,680 | A | 9/1993 | Sauter | 385/24 |
| 5,475,520 | A | 12/1995 | Wissinger | 359/172 |
| 5,500,523 | A | 3/1996 | Hamanaka | 250/216 |
| 5,777,768 | A | 7/1998 | Korevaar | 359/172 |
| 5,790,291 | A | 8/1998 | Britz | 359/159 |
| 6,052,498 | A | 4/2000 | Paniccia | 385/14 |
| 6,239,888 | B1 * | 5/2001 | Willebrand | 398/129 |
| 2003/0035181 | A1 * | 2/2003 | Byers et al. | 359/172 |

FOREIGN PATENT DOCUMENTS

| EP | 0811862 A2 | 12/1997 |
|---|---|---|
| EP | 0876019 A2 | 2/1998 |
| EP | 1054520 A1 | 11/2000 |
| EP | 1079550 A1 | 2/2001 |
| GB | 2334396 A | 8/1999 |

OTHER PUBLICATIONS

Toshikazu, Sakano, et al; "Three-Dimensional Board-toBoard Free-Space Optical Interconnects and Their Application To The Prototype Multiprocessor System: Cosine-III" Applied Optics, Optical Society of America, Washington, D.C.; vol. 34, No. 11; Apr. 10, 1995; pp. 1815-1522, XP000497507; ISSN: 0003-6935.
IEEE Photonics Technology Letters, vol. 5, No. 7, Jul. 1993, pp. 825-828.
Electronics Letters, vol. 30, No. 16, Aug. 1994, pp. 1323-1324.

\* cited by examiner

*Primary Examiner*—Agustin Bello (57) ABSTRACT

Internal communication signals in a stored program controlled system comprising a plurality of units configured to process signals are provided by an optical beam line which is proximal to all of the plurality of units. The system of this invention uses Space Division Multiplexing techniques to provide a plurality of logically independent subchannels over a single, shared free space optical beamline.

16 Claims, 7 Drawing Sheets

INTERCONNECTING PROCESSING UNITS OF A STORED PROGRAM CONTROLLED SYSTEM USING SPACE DIVISION MULTIPLEXED FREE SPACE OPTICS

CROSS-REFERENCE TO RELATED APPLICATIONS

This application is also related to U.S. patent application Ser. No. 09/932,703, entitled "Interconnecting Processing Units Of A Stored Program Controlled System Using Free Space Optics", filed concurrently herewith and commonly assigned to Lucent Technologies Inc., and incorporated by reference herein, with priority claimed for all commonly disclosed subject matter.

This application is related to U.S. patent application Ser. No. 09/932,704, entitled "Interconnecting Processing Units Of A Stored Program Controlled System Using Time Division Multiplexed Free Space Optics", filed concurrently herewith and commonly assigned to Lucent Technologies Inc., and incorporated by reference herein, with priority claimed for all commonly disclosed subject matter.

This application is also related to U.S. patent application Ser. No. 09/932,705, entitled "Interconnecting Processing Units Of A Stored Program Controlled System Using Wavelength Division Multiplexed Free Space Optics", filed concurrently herewith and commonly assigned to Lucent Technologies Inc., and incorporated by reference herein, with priority claimed for all commonly disclosed subject matter.

This application is also related to U.S. patent application Ser. No. 09/932,707, entitled "Installation Of Processing Units Into A Stored Program Controlled System Wherein The Component Processing Units Are Interconnected Via Free Space Optics", filed concurrently herewith and commonly assigned to Lucent Technologies Inc., and incorporated by reference herein, with priority claimed for all commonly disclosed subject matter.

FIELD OF THE INVENTION

This invention relates to the field of stored program controlled systems, including, but not limited to, telephone switching offices, data routers, and robotic machine tools; and, more specifically, this invention describes an optical communication path interconnect to provide communications for component processing units of the stored program controlled systems, wherein the data is carried on the optical communication path using space division multiplexing.

BACKGROUND OF THE INVENTION

The invention of U.S. patent application Ser. No. 09/932,703 discloses a system and method for interconnecting processing units of a stored program controlled system using free space optics. According to this disclosure, an optical beam line carries signals among the various processing units. Multiple distinct streams of data are communicated within that system. When multiple distinct communication streams within a system or network share the same physical media, a multiplexing and Media Access Control (MAC) protocol is necessary for optimal system operation. These protocols help insure that the system performs at the desired capacity, performance and reliability levels.

One important function of any multiplexing and MAC protocol is to divide the limited capacity of the shared physical communication channel among the various logical streams or subchannels that share it. This subdivision of the shared physical channel provides capacity guarantees, so that each of the logical channels receives an equal portion of the available capacity, or a pre-arranged larger or smaller proportion of this capacity. Pre-allocation of capacity provides a guaranteed level of capacity to all users. Such pre-allocation is often wasteful of system capacity because, if a given subchannel has no traffic to send, other subchannels may have more traffic than they can handle.

Other multiplexing and MAC protocols provide statistical multiplexing of the system's capacity, wherein all potential transmitters on the shared channel negotiate for an opportunity to transmit. The theoretical maximum load offered, if all transmitters are operating at full rate, often exceeded the capacity of the shared media, which requires various buffering, queuing and priority techniques to govern when each transmitter operates. This system has potential channel utilization efficiency advantages, at the expense of making it more difficult to guarantee a minimum individual subchannel capacity or latency.

Another important function of any multiplexing and MAC protocol is to direct or route a given channel's traffic to the intended receiver over the shared medium. Channels in an optical system are often statically mapped so that each subchannel operates in its own space (or similar separators as known in the art), and the receiver is determined by the location in space assigned to the transmitter. In other cases, traffic is offered to the shared medium as packets. These packets contain a destination address, which is used by switching or routing functions to complete the connections.

The concept of priority is also important to multiplexing and MAC protocols. Some messages have a higher priority than others, based upon the importance or time sensitivity of their contents. The multiplexing and MAC protocol must take priority into account as it manages access to the shared medium.

Security is often an intrinsic function of multiplexing and MAC protocols. If there is a hazard associated with unauthorized interception of messages over the shared medium, the protocol can take steps to eliminate (or at least greatly reduce the impact of) this hazard. One means for heightened security is physically separating sensitive traffic from all other traffic in the various parallel submedia in the transmission medium. A more common approach is to use some form of encryption at the transmitter, and decryption at only the authorized receiver(s).

A further function that multiplexing and MAC protocols provide is fault tolerance and fault recovery. If a failure occurs that disables the shared media or significantly reduces its capacity, the protocol invokes various diagnostic actions to discover the source of the problem and then appropriate recovery actions to attempt to correct the source of the problem. Often, the fault recovery operation involves switching the traffic to a redundant medium or attempting to shed load so only the highest priority traffic is allowed on the remaining capacity.

One form of multiplexing and MAC protocols usable in a free space optical beam line medium is space division multiplexing. In a Space Division Multiplexed (SDM) system, the shared medium is divided into a set of simultaneously transmitted beams, all occupying different subvolumes of the shared beamline volume. Each subchannel sharing the medium is assigned a specific beam with a specific spatial position on which it carries traffic. The number of beams assigned per subchannel may be equal for all subchannels, or some subchannels may be given higher capacity by assigning them a higher proportion of beam volumes on which to transmit.

SUMMARY OF THE INVENTION

This problem is solved and a technical advance is achieved in the art by a system and method that uses free space optics to interconnect processing units of a stored program controlled system that uses space division multiplexing. The system of this invention uses Space Division Multiplexing techniques to provide a plurality of logically independent subchannels over a single shared freespace optical beamline. The single logical beam is divided among the subchannels, with each subchannel operating in an assigned sub-volume or sub-volumes. Many narrowly collimated laser beams are arranged in parallel (or nearly parallel) such that an individual channel is formed between central hub(s) and each processing unit. Advantageously, the property of light beams to cross one another without interference can be used to provide novel physical arrangements and system topologies.

BRIEF DESCRIPTION OF THE DRAWINGS

A more complete understanding of this invention may be obtained from a consideration of the specification taken in conjunction with the drawings, in which.

DETAILED DESCRIPTION

Figure 1:
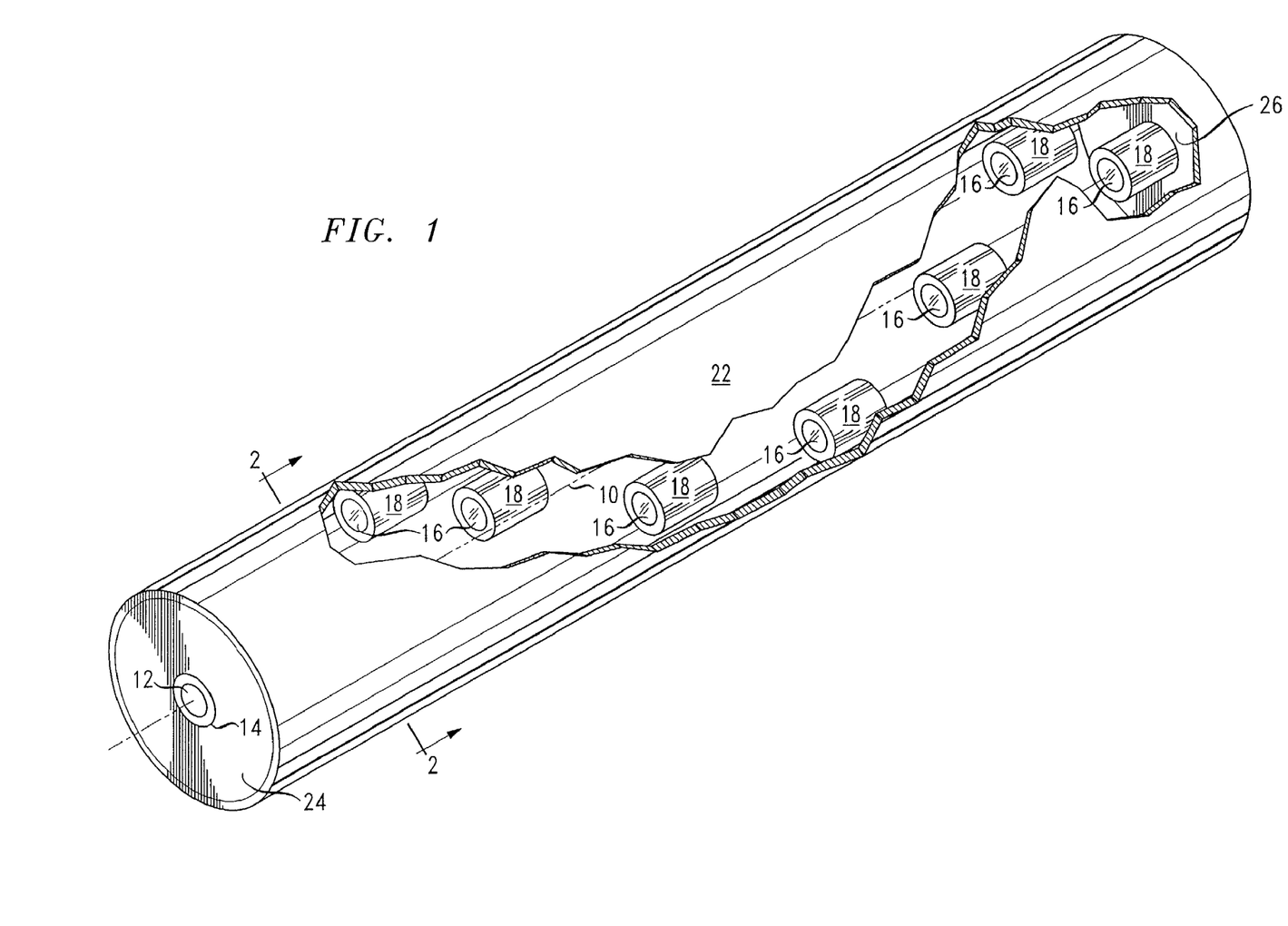
FIG. 1 is a perspective view of a beam line illustrating the relationship of the beam line and probes according to a general overview of an exemplary embodiment of this invention.

Turning to FIG. 1, a perspective view of a beam line 10 according to one exemplary embodiment of this invention is shown. According to this exemplary embodiment, a beam line 10 is generated by a transmitter 12 within a transmitting probe 14 which projects optically encoded signals, as will be described further, below. Transmitting probe 14 produces a beam line 10 with desired spatial characteristics along the length of its path.

A plurality of receivers 16 within receiving probes 18 are distributed throughout beam line 10 along the outer periphery in the form of a spiral or helix, in this exemplary embodiment. Other possible configurations of probes along the beam line will be apparent to one skilled in the art after studying this disclosure. Receiving probes 18 are distributed in a helix in this exemplary embodiment so that there is a minimal amount of shadowing; that is, one receiving probe 18 being in the shadow of a previous receiving probe 18 in beam line 10 causing the probe in the shadow to receive little or none of the optically encoded signals in beam line 10. Beam line 10 may be contained within a reserved volume or conduit 22 in an enclosure, such as a cylinder or pipe or, alternatively, may be in the open.

Conduit 22 includes, in this exemplary embodiment, a first terminal unit 24 and a second terminal unit 26. First terminal unit 24 includes a transmitting probe 14 and second terminal unit 26 includes a receiving probe 18, in this exemplary embodiment. As will be discussed further, below, first terminal unit 24 and/or second terminal unit 26 may include both transmitters and receivers, and may be interconnected to recycle the encoded signal.

Figure 2:
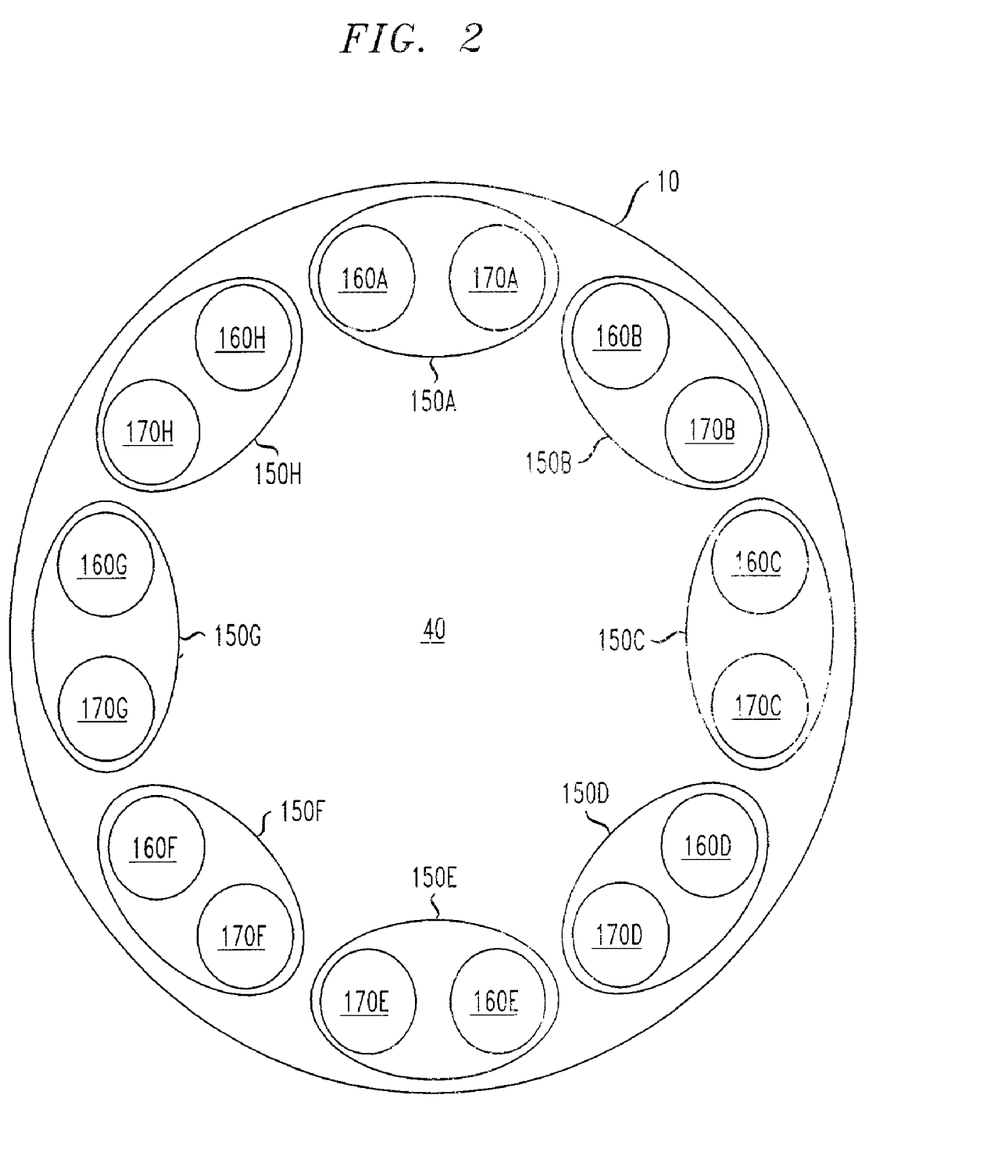
FIG. 2 illustrates separation of the beam line of FIG. 1 into sub-volumes, according to an exemplary embodiment of this invention.

FIG. 2 illustrates the separation of the beamline 10 volume into sub-volumes 150 in the context of the exemplary embodiment of FIG. 1. Each sub-volume is reserved for carrying a bi-directional connection between a single processing unit and the central hub at the end of the beamline. Reserved volumes 150A–150G are arranged around the circumference of beamline 10 in this example, but it is appreciated that other arrangements are possible, including many concentric rings of volumes, or a spiral arrangement (as is illustrated in FIG. 1). Each reserved volume 150 is further divided into transmit signals 160A–160H, and receive signals 170A–170H. In practice, these volumes can be side by side as shown, or coincident with one another, or overlapping to some degree. Since there is no equivalent of a "short circuit" in the freespace optical domain, the beam volumes can overlap and cross one another as they traverse the beamline 10.

Figure 3:
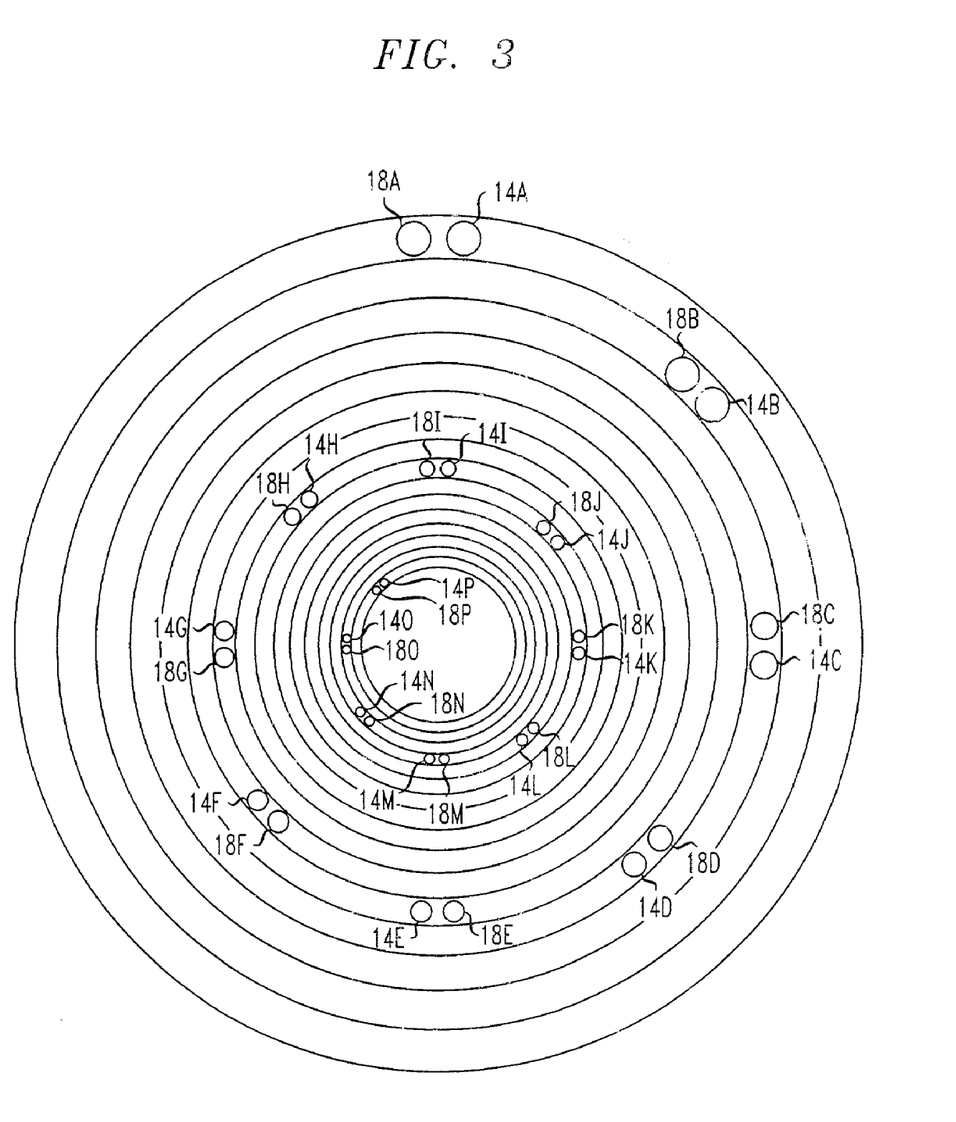
FIG. 3 is a perspective view of a large system looking down the center of the beamline from one end.

Turning now to FIG. 3, FIG. 3 is a representation of what one would see if one removed the end cap and central hub from the system of FIG. 1, and looked straight down the center of the beamline. The concentric circles are the edges of the bounding bulkheads between the frames holding the processing units. Transmit probes 14A–14P and receive probes 18A–18P on all sixteen processing units in this exemplary embodiment are visible from this perspective, illustrating the advantages of the helical arrangement. If a central hub (not shown, but explained further, below, in connection with FIG. 5), containing an array of transmit and terminal receive probes 135 is located in the end position, it is possible to create unobstructed beam paths between all transmit probes and all receive probes.

Figure 4:
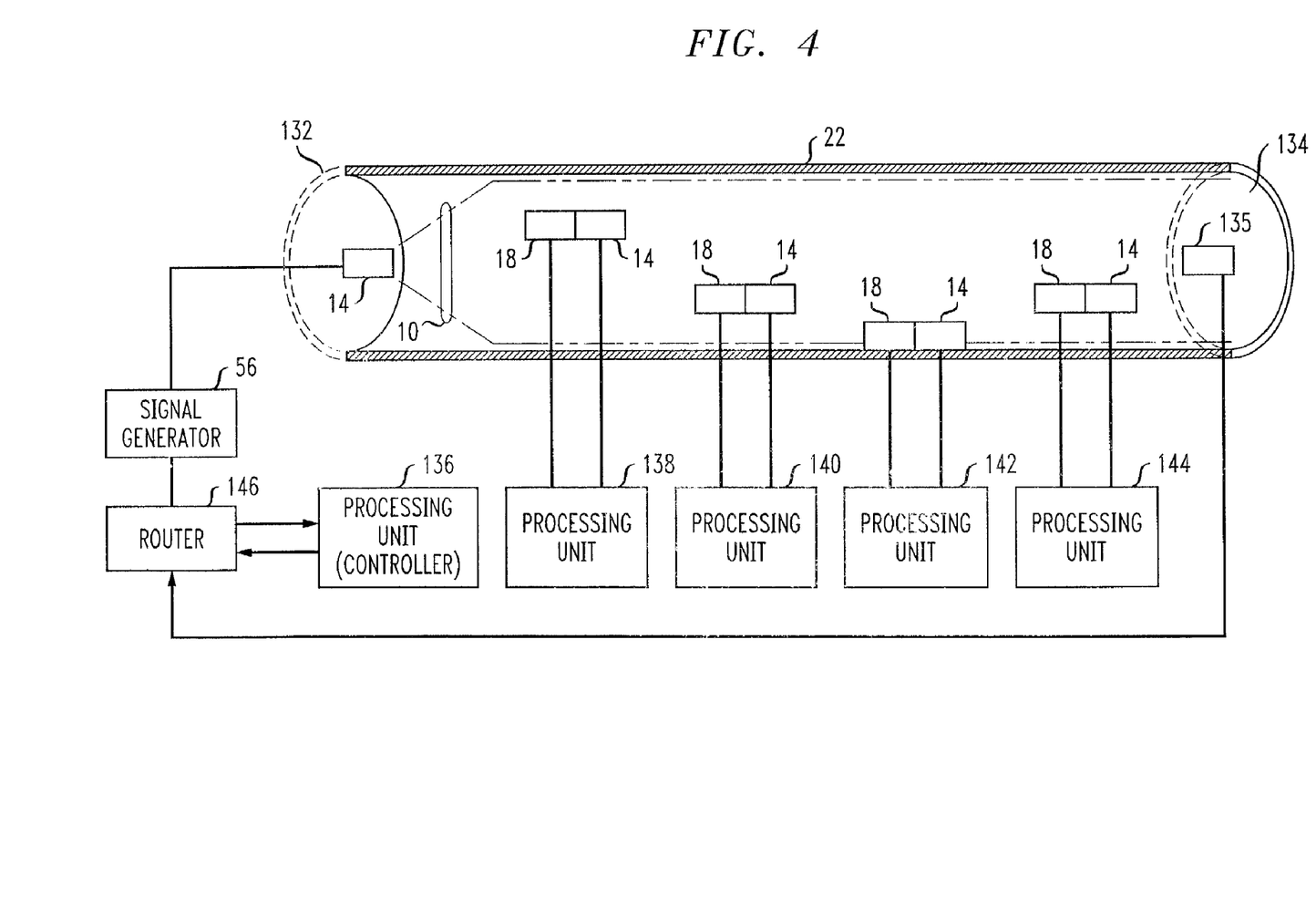
FIG. 4 is a block diagram of an exemplary embodiment of this invention illustrating full duplex communication among the processing units.

Turning now to FIG. 4, a further exemplary embodiment of this invention is shown. In this exemplary embodiment, beam line 10 is uni-directional, i.e., signals flow in the direction from unidirectional first terminal unit 132 to second uni-directional terminal unit 134 and are then recirculated, as will be described further below. In this exemplary embodiment, a processing unit controller 136 and processing unit 138, 140, 142 and 144 are each connected to a transmitting probe 14. Processing units 138, 140, 142 and 144 are connected to receiving probes 18. Terminal 134 uses proble 135.

In the exemplary embodiment of FIG. 4, processing unit or controller 136 originates electrical control signals for processing units 138, 140, 142 and 144 and communicates such signals to router 146. Router 146 comprises a conventional router as is known in the art. Router 146 communicates signals for processing units 138, 140, 142 and 144 to a signal generator 56. Transmitter 14 in unidirectional first terminal unit 132 optically encodes the signals onto a plurality of subvolumes and assembles these into beamline 10. Receiving probes 18 receive the optically encoded signals and convey them to their respective processing unit 138, 140, 142 and 144. Each processing unit 138, 140, 142 and 144 may send feedback or other information to controller 136 by creating beams and injecting the beams into beam line 10, which are all received at terminal receiving probe 135 in uni-directional second terminal unit 134. The signals are then fed back to router 146 where they may be further circulated in beam line 10 or delivered to controller 136.

Systems using many of the embodiments of this invention (i.e., FIG. 4) must include features to prevent messages from recirculating in the beam line 10. If these features are not included, infinite feedback loops are possible, where a single message is continuously relayed between two endpoints and/or probes, quickly absorbing all available bandwidth. To prevent this, a means to break these loops is provided. Router 146 is programmed (or programmed in conjunction with the probes or endpoints) to detect addresses that lead to looping behavior, and not forward those messages back into the beam line. Alternately, the optical characteristics of the beam line, transmitters and receivers are controlled to prevent messages from a given source from circulating indefinitely. For example, the diameter or directionality of the beams from probe 14 are designed to be fully intercepted by probes 18, with no optical power flowing past probes 18 to receive probe 135.

Figure 5:
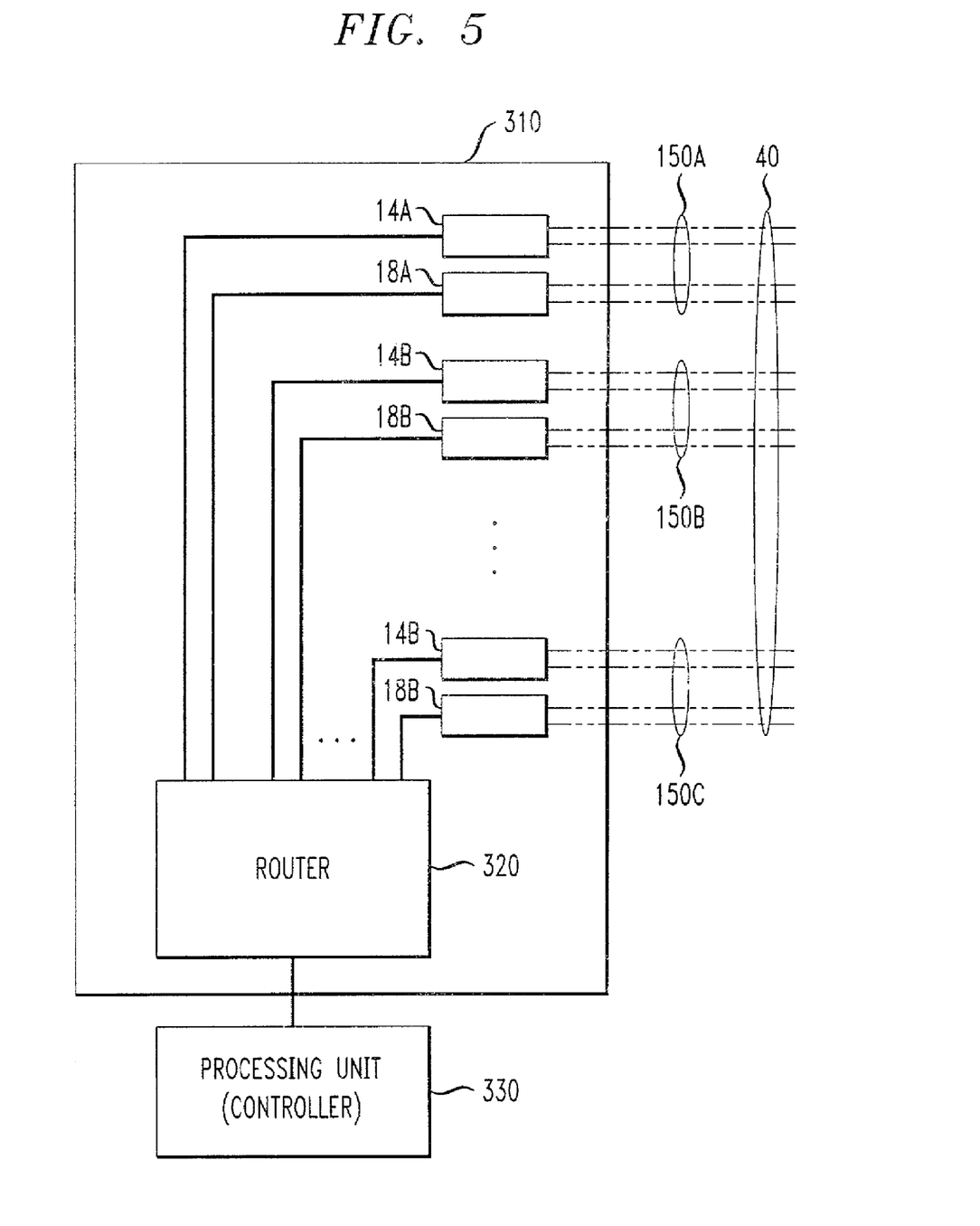
FIG. 5 is a block diagram of a central hub according to one exemplary embodiment of this invention.

FIG. 5 illustrates the details of the central hub used in this space division implementation. Since a plurality of individual, highly collimated beams are used (at least one in each direction between the hub and each processing unit), the hub has many receive and transmit probes, each probe dedicated to a single beam. Shared beamline 40 is subdivided into individual beam paths 150A–150C, each directed to a specific processing unit some distance down the beamline. A plurality of transmit probes 14A–14C and receive probes 18A–18C are arranged in a hub array 310 occupying some or all of the inner surface of the end cap of the beamline 10. Router 320 accepts signals from each of the receive probes 18A–18C, decodes their address, and relays them to the appropriate destination processing unit over transmit probes 14A–14C. Some of the traffic is routed through router 320 to processing unit controller 330 that performs centralized control and administration for all elements of the system connected through beamline 10.

Figure 6:
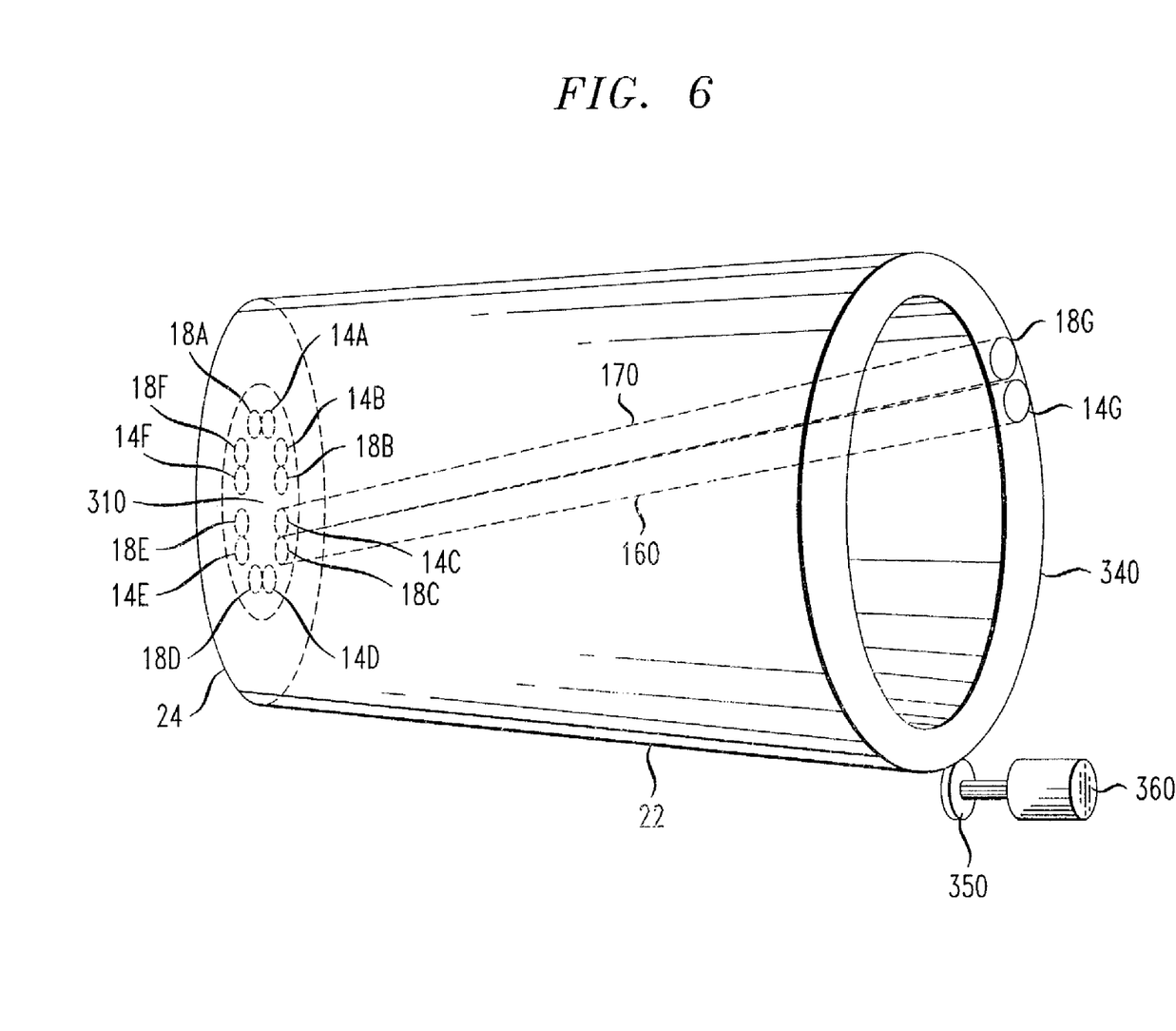
FIG. 6 is a block diagram of the physical arrangement of probes at a hub of FIG. 5 and a processing unit transmit and receive probes.

In FIG. 6, the physical relationship among the probes associated with a processing unit and the probes on the hub is shown. Central hub electro-optical assembly 24 is located at the end cap of the beamline enclosure 22. Included in electro-optical assembly 24 is hub array 310, which includes a plurality of transmit probes 14A–14F and receive probes 18A–18F. These probes are shown arranged in an annular ring around the periphery of circular hub array 310, but other arrangements are possible.

Highly collimated beams 160 and 170 pass through specific reserved portions of the beamline volume, and terminate on processing unit probe ring 340. The processing unit probe ring 340 is a movable structure associated with each processing unit on the periphery of the beamline, with a large aperture in the center through which beams directed to more distant processing units pass. Probe ring 340 can revolve to any position permitting the positioning of processing unit probes 14G and 18G at any position around the circumference of the beamline. This permits fine adjustment of the arrangement of the individual beams in the beamline volume. Drive roller 350 moves the position of the beam in response to actuator 360. Drive roller 350 may be a metallic or plastic roller, tire, or gear. Actuator 360 may be a stepper motor, servomotor, or a simple hand operated knob or crank.

Figure 7:
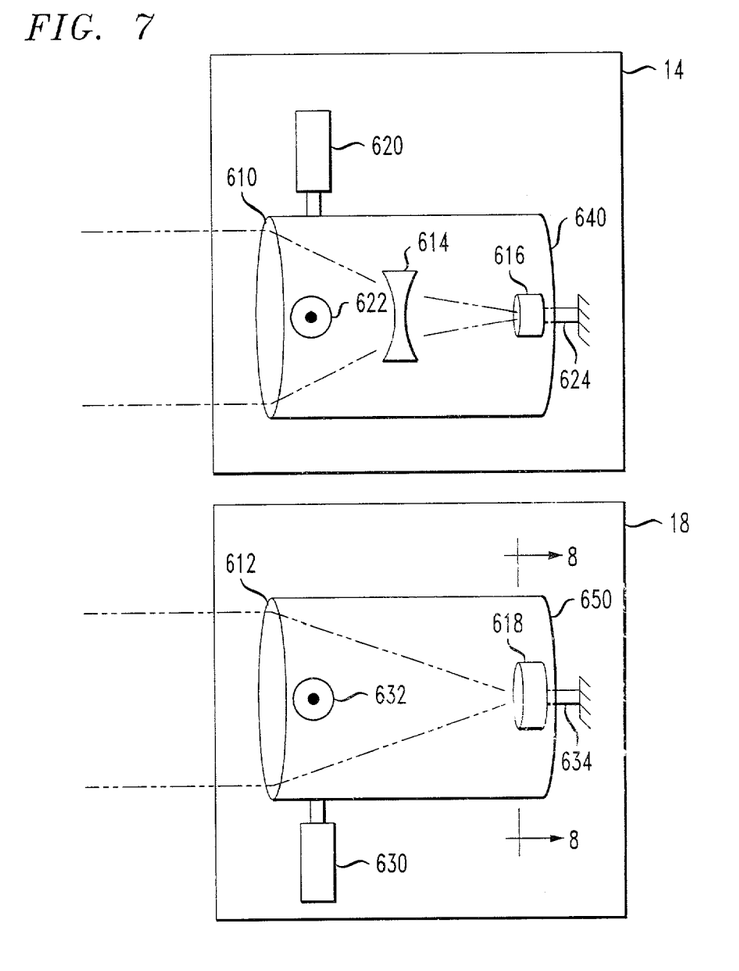
FIG. 7 is a block diagram of a processing unit's transmit and receive probe.

FIG. 7 is a block diagram of the transmit probes 14 and receive probes 18. Transmit probe 14 consists of a laser 616 that produces a modulated light beam. Diverging lens 614 and converging lens 610 form a reverse Galilean telescope to expand and collimate the beam. Beam divergence control is particularly important in the space division multiplexed implementation, because the more control there is on beam divergence, the more information channels can be put through a beamline of given diameter without cross-talk. While lens system 614 and 618 do result in a beam with expanded diameter compared to the beam generated by laser 616, this expanded beam has much smaller divergence. The far-field beam size that results after traversing tens or hundreds of meters of freespace beamline will be significantly less using this arrangement. In receive probe 18, lens 612 gathers light from the beamline, and focuses it at the center of quadrant photodiode 618 (described below).

In some embodiments of the system, especially those with very long beamlines, it may be necessary to perform active alignment to precisely aim the pairs of transmit and receive probes. Electro-mechanical components perform these beam steering functions. Rigid enclosures 640 and 650 provide a stable base for the electrical optical components of each probe to ride on. One end of these enclosures is anchored through a flexible coupling 624 and 634 to a rigid mechanical support (either the hub array 310 or the probe ring 340 in FIG. 6). The other end of the enclosures is positioned by actuators to permit fine control of the direction that the probes point. Actuators 620, 630 control the vertical position of the ends of the probes, influencing the elevation of the beams. Actuators 622, 632 control the horizontal position, influencing the beam's azmuth. Actuators 620, 622, 630, and 632 may be stepper motors with lead screws, servomotors, piezoelectric actuators if automatic control of beam direction is desired, or simply hand adjustment knobs to be used during system set-up.

Figure 8:
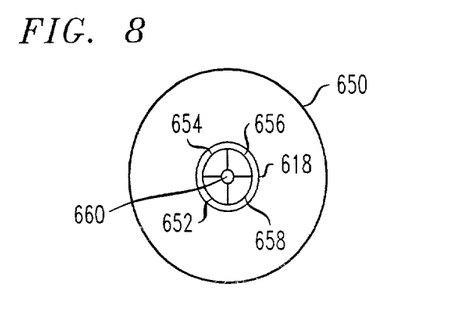
FIG. 8 is a block diagram of a quadrant photodetector as used in a receive probe according to an exemplary embodiment of this invention.

FIG. 8 describes the operation of a quadrant photodetector in this application. This is the view through section 8 on FIG. 7. The back bulkhead portion of the rigid support structure 650 supports the quadrant photodetector component 618. Photodetector component 618 comprises five separate photodiodes, the central receiver photodiode 660, and four pie-shaped error photodiodes 652, 654, 656, and 658. Central receiver 660 is optimized for high speed operation, and detects the data from the modulated beam. Error photodiodes 652, 654, 656, and 658 are configured to detect which direction and to what degree the spot that illuminates the photodetector is off center. A feedback loop is established between the actuators and the error photodiodes to move the probes until the spot of light is centered on receiver photodiode 660. Depending upon the mechanical characteristics of the system, this feedback loop may be fast acting and able to compensate for vibrations of the base on which the system is anchored. Alternatively, it may be slow acting, designed to compensate for the slower effects of thermal expansion and variable floor loads.

During system installation and adjustment of the preferred embodiment, the frame containing a new processing unit is moved into position into the beam line 10, as described in U.S. patent application Ser. No. 09/932,707, entitled "Installation Of Processing Units Into A Stored Program Controlled System Wherein The Component Processing Units Are Interconnected Via Free Space Optics", incorporated by reference above. The probe ring is rotated to position the probes at a position around the beam line to provide an unobstructed path to the central hub. A free receive and transmit probe on the hub array are allocated to the new processing unit. The receive and transmit probes actuators on both the processing unit end and central hub end are driven to a coarse position determined by a geometric analysis of the various element positions. Then, a fine positioning step is entered, where the error signals from the error photodiodes are processed, and the actuators are moved until the error signals are minimized. Notice that position error monitoring is only possible on receive probes. The positioning commands for the transmit probes are derived by processing the receive probe errors through an algorithm that takes the overall geometry of the system into account, and estimates the pointing error of the transmit beam.

It is to be understood that the above-described embodiments are merely illustrative principles of the invention and that many variations may be devised by those skilled in the art without departing from the scope of this invention. It is, therefore, intended that such variations be included within the scope of the following claims.

What is claimed is:

1. A method for use in a stored program controlled system comprising a plurality of processing units and a central hub for interconnecting processing units using space division multiplexing over free space optical beam lines, said method including the steps of:
generating collimated beamlines at respective ones of said plurality of processing units for destination processing units comprising other ones of said plurality of processing units;
modulating messages on said collimated beamlines;
transmitting each of said beamlines through an assigned volume within a conduit that encloses said free space beamlines and said hub;
receiving at least one of said beam lines at said hub while permitting at least one other of said beam lines to pass through said hub on its way to another destination within the conduit beyond said hub; and
demodulating said at least one beam line to recover said message.

2. A method for use in a stored program controlled system comprising a plurality of processing units and a central hub for interconnecting processing units using space division multiplexing over a free space optical beam line, said method including the steps of:
generating a collimated beamline at one of said plurality of processing units for a destination processing unit comprising another one of said plurality of processing units;
modulating a message on said collimated beamline;
transmitting said beam through a volume of said free space beamline where the beamline is enclosed within a conduit;
receiving said beam at said hub;
demodulating said beam to recover said message; and
arranging said volumes in a helix around the circumference of said beamline and around the centerline within the conduit.

3. A method in accordance with claim 1 further including the step of arranging said hub comprises arranging a plurality of transmit probes and a plurality of receive probes in an array.

4. A method in accordance with claim 1 further including the step of routing said messages at said hub.

5. A method in accordance with claim 1 further including a receive probe at a selected processing unit, said method further including the steps of:
modulating a message on said collimated beamline at said hub;
transmitting said beam through a reserved volume of said free space beamline;
receiving said beam at said selected processing unit and demodulating said beam to recover said message.

6. A method for use in a stored program controlled system comprising a plurality of processing units and a central hub for interconnecting processing units using space division multiplexing over a free space optical beam line, said method including the steps of:
generating a collimated beamline at one of said plurality of processing units for a destination processing unit comprising another one of said plurality of processing units;
modulating a message on said collimated beamline;
transmitting said beam through a volume of said free space beamline that is contained within a conduit;
receiving said beam at said hub that is contained within the conduit;
demodulating said beam to recover said message;
arranging said transmit and receive probes of a processing unit on a movable probe ring contained on each of said processing units; and
rotating the movable probe ring within a plane substantially perpendicular to beamline and a centerline of the conduit.

7. A method in accordance with claim 6 wherein said processing units include an actuator connected to said movable probe ring, said method further including the step of aligning said probes with corresponding beams by rotating the ring by said actuator.

8. An apparatus for use in a stored program controlled system comprising a plurality of processing units for interconnecting processing units to provide space division multiplexing over a free space optical beam line, said apparatus comprising:
a transmit probe configured to modulate a message on a first collimated beamlines and to transmit said first beam through a volume of said free space beamline;
a receive probe configured to receive a second collimated beamline in said volume of said free space beamline and to demodulate said second collimated beamline to recover said message;
a hub that receives the beamline transmitted by the transmit probe and transmits the beamline received by the receive probe;
a conduit that encloses the beamlines, hub, and transmit and receiver probes, the hub disposed within the conduit so that at least some beamlines other than the first and second beamlines pass through the hub on route to a further destination without being processed by the hub.

9. An apparatus for use in a stored program controlled system comprising a plurality of processing units for interconnecting processing units to provide space division multiplexing over a free space optical beam line, said apparatus comprising:
a transmit probe configured to modulate a message on a first collimated beamline and to transmit said first beam through a volume of said free space beamline;
a receive probe configured to receive a second collimated beamline in said volume of said free space beamline and to demodulate said second collimated beamline to recover said message;
a conduit that encloses the beamlines and transmit and receiver probes, the transmit and receive probes arranged in a helix around a centerline of said conduit.

10. An apparatus in accordance with claim 9 wherein each of said processing units includes a movable probe ring to align said transmit and receive probes of a processing unit, said movable probe ring adapted for rotation about the centerline of the conduit substantially in a plane perpendicular to the beamlines.

11. An apparatus in accordance with claim 10 wherein said processing units include an actuator connected to said movable probe ring configured to align said probes to provide control over transmit and receive probe alignment.

12. An apparatus in accordance with claim 10 wherein said actuator includes stepper motors with lead screws.

13. An apparatus in accordance with claim 10 wherein said actuator comprises servomotors.

14. An apparatus in accordance with claim 10 wherein said actuator comprises a piezoelectric actuator.

15. An apparatus in accordance with claim 10 wherein said actuator comprises manual adjustors.

16. An apparatus in accordance with claim 8 wherein said receive probes include quadrant photodetectors.

* * * * *